(12) United States Patent
Hsin-Chang et al.

(10) Patent No.: US 7,363,745 B2
(45) Date of Patent: Apr. 29, 2008

(54) PEST TRAPPING DEVICE

(75) Inventors: Liao Hsin-Chang, Chaojhou Township, Pingtung County (TW); Liao Yi-Shawn, Chaojhou Township Pintung County (TW)

(73) Assignee: Yi-Shawn Liao, Pingtung County (TW)

( * ) Notice: Subject to any disclaimer, the term of this patent is extended or adjusted under 35 U.S.C. 154(b) by 0 days.

(21) Appl. No.: 11/117,360

(22) Filed: Apr. 29, 2005

(65) Prior Publication Data

US 2006/0242889 A1 Nov. 2, 2006

(51) Int. Cl.
*A01M 13/00* (2006.01)
(52) U.S. Cl. .......................................... 43/113; 43/139
(58) Field of Classification Search .................. 43/113, 43/139, 112, 122
See application file for complete search history.

(56) References Cited

U.S. PATENT DOCUMENTS

| | | | | |
|---|---|---|---|---|
| 2,384,930 A | * | 9/1945 | Kendrick | 43/113 |
| 3,987,578 A | * | 10/1976 | Rueff | 43/139 |
| 3,998,866 A | * | 12/1976 | Oswald | 560/357 |
| 4,141,173 A | * | 2/1979 | Weimert et al. | 43/113 |
| 4,282,673 A | * | 8/1981 | Focks et al. | 43/113 |
| 4,856,226 A | * | 8/1989 | Taylor | 43/113 |
| 5,020,270 A | * | 6/1991 | Lo | 43/112 |
| 5,157,865 A | * | 10/1992 | Chang | 43/113 |
| 5,167,090 A | * | 12/1992 | Cody | 43/139 |
| 5,222,322 A | * | 6/1993 | Mastromonaco | 43/139 |
| 5,241,779 A | * | 9/1993 | Lee | 43/139 |
| 5,255,468 A | * | 10/1993 | Cheshire, Jr. | 43/113 |
| 5,301,458 A | * | 4/1994 | Deyoreo et al. | 43/139 |
| 5,311,697 A | * | 5/1994 | Cavanaugh et al. | 43/132.1 |
| 5,323,556 A | * | 6/1994 | Carle | 43/139 |
| 5,329,725 A | * | 7/1994 | Bible | 43/113 |
| 5,595,018 A | * | 1/1997 | Wilbanks | 43/112 |
| 5,669,176 A | * | 9/1997 | Miller | 43/139 |
| 5,813,166 A | * | 9/1998 | Wigton et al. | 43/107 |
| 5,896,695 A | * | 4/1999 | Walker | 43/107 |
| 5,937,572 A | * | 8/1999 | Neumann | 43/132.1 |
| 6,226,919 B1 | * | 5/2001 | Septer | 43/139 |
| 6,286,249 B1 | * | 9/2001 | Miller et al. | 43/139 |
| 6,318,874 B1 | * | 11/2001 | Matsunaga | 362/119 |
| 6,505,436 B2 | * | 1/2003 | Neumann | 43/132.1 |
| 6,511,200 B2 | * | 1/2003 | Matsunaga | 362/119 |
| 6,523,298 B2 | * | 2/2003 | Neumann | 43/132.1 |
| 6,530,172 B2 | * | 3/2003 | Lenz | 43/112 |

(Continued)

Primary Examiner—Kimberly S. Smith
(74) Attorney, Agent, or Firm—Troxell Law Office PLLC (57) ABSTRACT

A pest trapping device including a cap, a spewing member, a fan, a rotatable shaft, a transformer, a tray, a blue light emitting element, an electric circuit board, and a net. The spewing member has symmetrical holes to which support rods are secured for supporting the transformer controlling the rotatable shaft to rotate and further rotate the fan connected with the shaft. The tray is placed on the support rods for holding a pest-attracting chemical. The electric circuit board is positioned on a fixing frame fixed in the cap and connected with the light emitting element and the transformer that is turned on and off by a switch on the cap. When the device is powered, pests can be attracted by a smell giving out by the volatile chemical in the tray and the yellow color of the device, and during nighttime also by the blue light emitting element and sucked in by the fan and then held in the net.

8 Claims, 6 Drawing Sheets

U.S. PATENT DOCUMENTS

| | | | |
|---|---|---|---|
| 6,545,043 B1 * | 4/2003 | Coats et al. | 514/514 |
| 6,560,918 B2 * | 5/2003 | Nelson | 43/112 |
| 6,568,123 B2 * | 5/2003 | Nelson et al. | 43/107 |
| 6,568,125 B2 * | 5/2003 | Kleinhenz | 43/139 |
| 6,574,914 B2 * | 6/2003 | Smith | 43/113 |
| 6,591,545 B2 * | 7/2003 | Brunet | 43/112 |
| 6,594,946 B2 * | 7/2003 | Nolen et al. | 43/114 |
| 6,655,080 B2 * | 12/2003 | Spiro et al. | 43/139 |
| 6,675,528 B2 * | 1/2004 | Jablin | 43/139 |
| 6,688,035 B1 * | 2/2004 | Shichman | 43/112 |
| 6,718,685 B2 * | 4/2004 | Bossler | 43/107 |
| 6,817,139 B1 * | 11/2004 | Powell et al. | 43/113 |
| 6,817,140 B1 * | 11/2004 | Durand et al. | 43/139 |
| 6,840,003 B2 * | 1/2005 | Moore | 43/113 |
| 6,840,005 B2 * | 1/2005 | Durand et al. | 43/139 |
| 6,854,208 B1 * | 2/2005 | Chuang et al. | 43/125 |
| 6,892,492 B2 * | 5/2005 | Durand et al. | 43/139 |
| 6,898,896 B1 * | 5/2005 | McBride et al. | 43/113 |
| 6,925,752 B1 * | 8/2005 | Cherry et al. | 43/139 |
| 7,024,815 B1 * | 4/2006 | Visagie | 43/113 |

* cited by examiner

| Volatile chemicals | Average number of flea beetle caughted | Total number of flea beetle caughted | Attractive ratio (Treatment/Blank) |
|---|---|---|---|
| Blank | 8.33± 7.77[1]a[2] | 25 | 1.00 |
| Mustard oil | 28.67± 5.03ab | 86 | 3.44 |
| Benzyl isothiocynate | 10.00± 7.81a | 30 | 1.20 |
| Ethyl isothiocyancate | 40.00± 17.35b | 120 | 4.80 |
| Allyl isothiocyanate | 107.33± 21.73c | 322 | 12.88 |

1. The values are means±SD.
2. Means within a column followed by the same letter are not significantly difference ($P > 0.05$; Duncan's multiple range test).

Fig.5

| Trap color | Average number of flea beetles caught | Total number of flea beetles caught | Attractive ratio (Treatment/Blank) |
|---|---|---|---|
| Blue | 51.0± 4.1[1]ab[2] | 153 | 1.42 |
| Green | 41.7± 18.0a | 125 | 1.16 |
| Pink | 52.7± 16.2ab | 158 | 1.46 |
| Yellow | 81.7± 35.7b | 245 | 2.27 |
| Violet | 44.3± 9.5a | 133 | 1.23 |
| White | 51.3± 13.2ab | 154 | 1.43 |
| Blank | 36.0± 10.8a | 108 | 1.00 |

1. The values are means±SD.
2. Means within a column followed by the same letter are not significantly different ($P > 0.05$; Duncan's multiple range test).

Fig.6

PEST TRAPPING DEVICE

BACKGROUND OF THE INVENTION

1. Field of the Invention

This invention relates to a pest trapping device, particularly to one luring and trapping pests by utilizing colors, volatile chemicals and light lowering farmers' expense for prevention of vegetable damage caused by pests and for preserving farmers' and consumers' health.

2. Description of the Prior Art

As hygienic knowledge has become more important for our environment, organic produce has become more popular. Most people prefer vegetables grown without using insecticides. Official and private organizations have been engaging in propagating a method for preventing pest damage and reducing insecticides used in growing vegetables so pests may not become gradually accustomed to and build a stronger resistance against insecticides, and the environment may be less polluted by residue of insecticides on vegetables.

Figure 1:
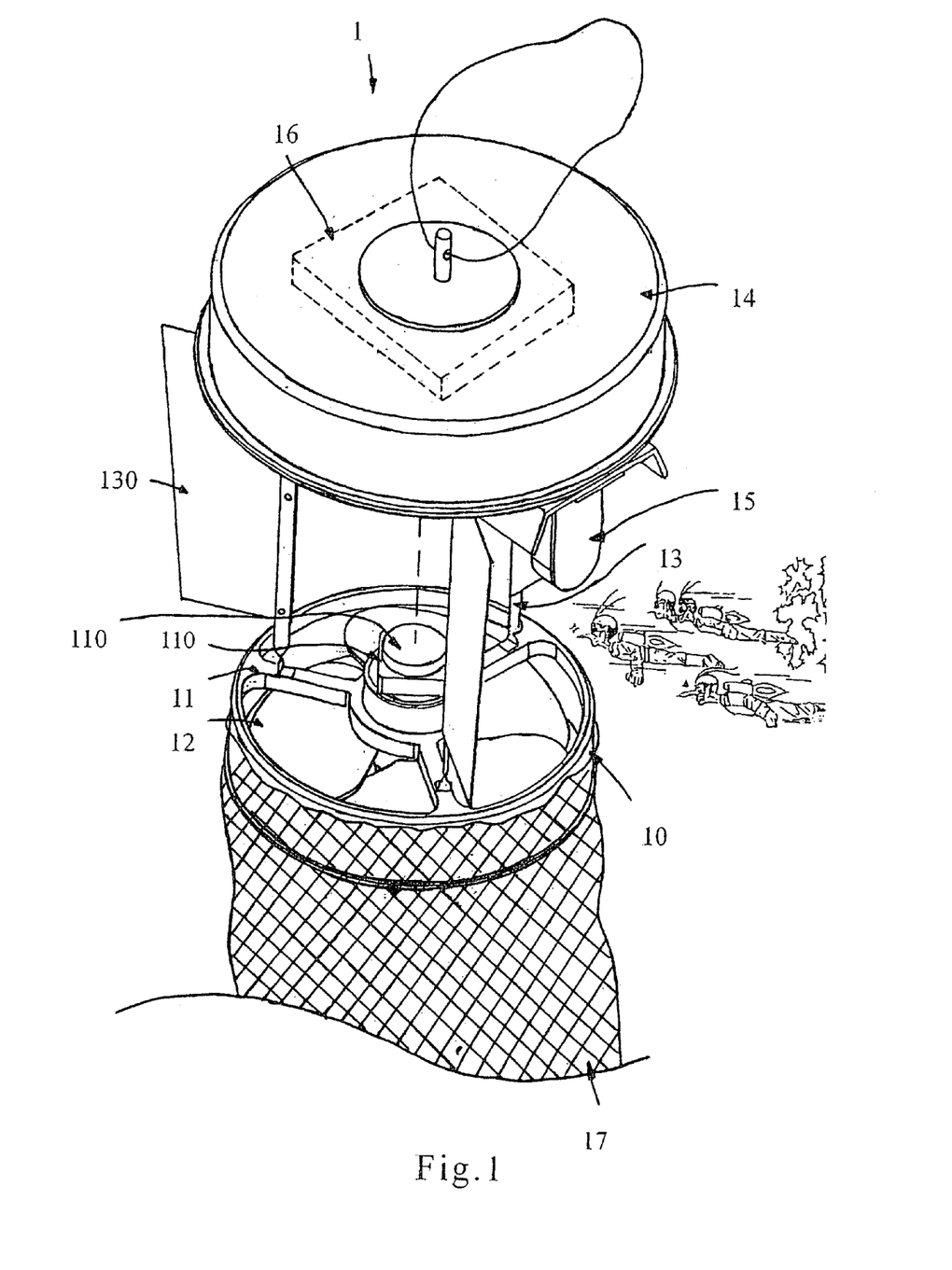
FIG. 1 is a perspective view of a conventional pest trapping light.

A conventional pest trapping light 1 shown in FIG. 1 includes a base 10 provided with an air outlet, an intermediate frame 11 provided with a motor 110, a fan 12 driven by an output shaft 111 of the motor 110 arranged in the intermediate frame 11, and a cap 14 supported by plural support rods 13 fixed on a top of the intermediate frame 11. The support rods 13 are combined with a plurality of reflective boards 130 and a fluorescent light 15 is deposited between the support rods 13, and connected electrically with a power source 16 deposited in the cap 14 as the motor 110 is. Further, a net 17 is fixed under the base 10 for trapping pests therein blown by the fan 12.

However, the conventional pest trapping light has the following drawbacks.

1. The cap 14 has a flat upper surface, which does not let light pass through widely and requires the reflective boards to increase the area contacted by the light.
2. The fluorescent tube for lighting is colored white or yellow, so during daytime the light is dimmed by sunlight, and during nighttime the light does not provide a good function for attracting pests.
3. Pests still living may easily escape due to a gap between the fan after they are sucked in by the fan, as the upper end and the lower end of the base are the same size.

SUMMARY OF THE INVENTION

This invention has been devised to offer a pest trapping device, which can attract and trap pests by making use an attraction of pests towards colors, volatile chemicals and light, to lower farmers' expense and excessive use of insecticides, and preserving farmers' and consumers' health.

The pest trapping device of the invention includes a cap, a spewing member, a tray for placing pest-attracting volatile chemicals, a light emitting element for emitting a light for attracting pests during nighttime, a fan providing an air current to spew a pest-attracting smell of the chemical and also blow pests into the net, an electric circuit board and a switch for turning on and off the light emitting element, the fan, and a transformer for rotating a rotatable shaft combined with the fan to rotate together. Then the fan is positioned in the spewing member, and the tray is positioned on supporting rods transversely fixed with an upper end section of the spewing member of a cylindrical shape. The electric circuit board is fixed on a fixing frame fixed in an interior of the curved-up cap, and the light emitting element is positioned in the fixing frame, with a reflective member adhered on the bottom of the fixing frame. Then the electrical circuit board, the switch, the light-emitting element, the transformer are electrically connected with one another. When the transformer is powered, the rotatable shaft is rotated to rotate the fan creating the air current to spread the smell of the volatile chemicals placed on the tray for attracting pests, and at the same time sucking pests into the spewing member and then into the net under the spewing member all the time. Further during nighttime the light emitting member is lit up for attracting pests with the smell of the volatile chemicals together. The light emitting element is protected by the electric circuit board, which stabilizes a voltage and current of electricity provided to the light emitting element. Moreover, the outer surface of the device is colored yellow for intriguing pests most effectively. Therefore, the pest-trapping device in the invention makes use of the pest's sensitivity to smell and color for easily attracting them and trapping them so that farmers can reduce the use of insecticides, and consumers can eat vegetables with safety.

BRIEF DESCRIPTION OF DRAWINGS

This invention will be better understood by referring to the accompanying drawings, wherein.

DETAILED DESCRIPTION OF THE PREFERRED EMBODIMENTS

Figure 2:
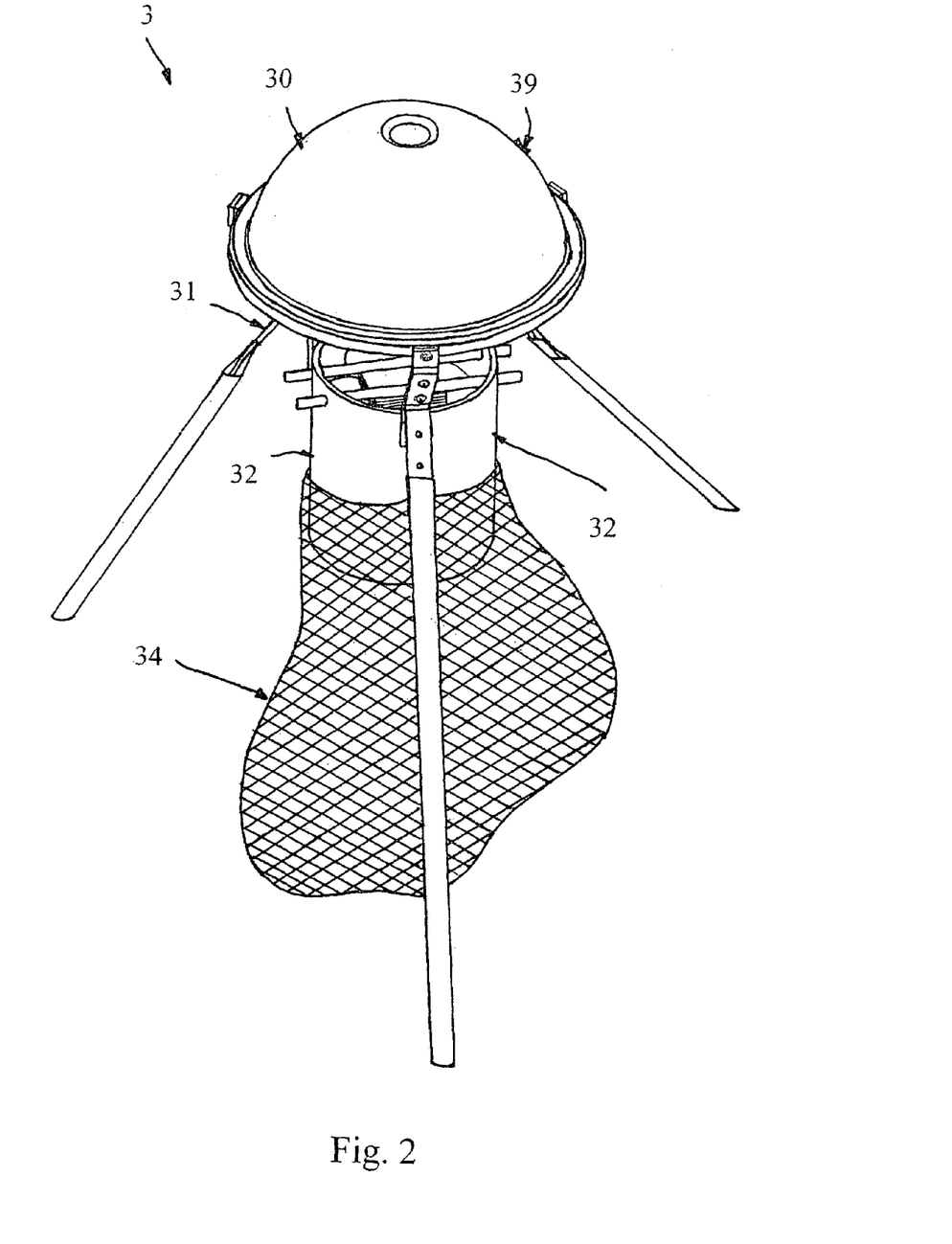
FIG. 2 is a perspective view of a first embodiment of a pest trapping device in the present invention.
Figure 3:
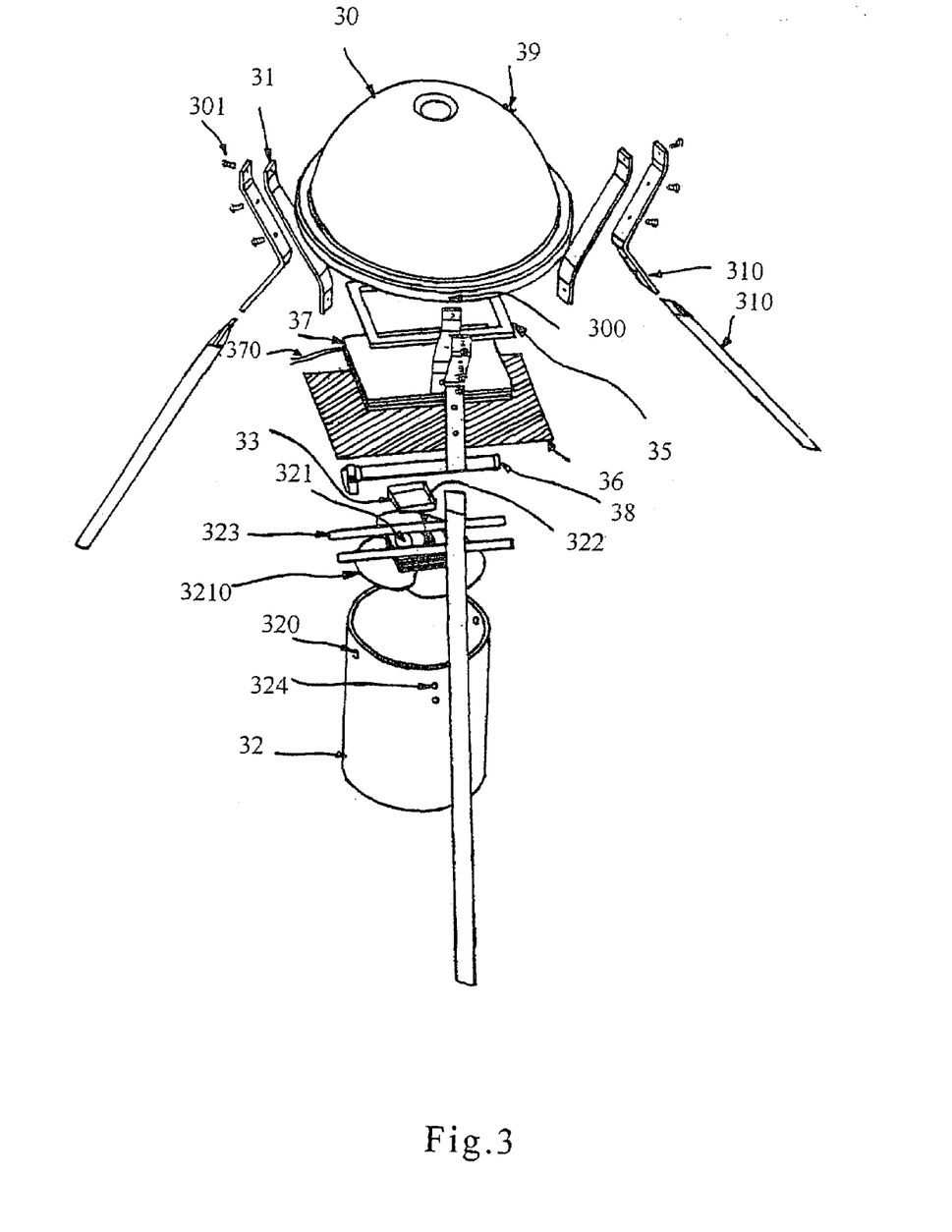
FIG. 3 is an exploded perspective view of the first embodiment of the pest trapping device in the present invention.

A first embodiment of a pest trapping device in the present invention, as shown in FIGS. 2 and 3, includes a cap 30, a plurality of support rods 31 and a spewing member 32 and a net 34.

The spewing member 32 is cylindrical and has symmetrical fixing holes 320 in an upper end section to which and output shaft 321 and a support member 323 of a transformer 322 of a driving shaft 321 a stably secured. A tray 33 is fixed to the support member 323 for placing a chemical for attracting pest, such as allyl isothiocyanate or Cuelure, methyl clove oil and pest pheromone possessing smell in a liquid or solid state. Allyl isothiocyanate in the liquid or solid state is the most preferable. The output shaft 321 is fixed to the fan leaves 3210, and the spewing member 32 is further provided with a plurality of holes 324 in the upper end section. A slender-mesh net 34 is attached with a lower end of the spewing member 32 for trapping and keeping pests attracted into the device from escaping out. Besides, the support member 323 may be formed integral with the spewing member 32 so that the output shaft 321 and the transformer 322 of the driving output shaft 321 may be effectively secured therein.

The cap 30 is curved and has a plurality of holes 300 in a circumferential edge for screws 301 securing the plurality of support rods 31 to the cap 30. Further, the support rods 31 are also fixed with the spewing member 32 by screws 301 inserted through the holes 324, and the spewing member 32 is combined with the cap 30. Further, a fixing frame 35 is secured in the cap 30, and a reflective member 36 is adhered with the lower side of the fixing frame 35, preferably made of aluminum foil. An electric circuit board 37 is fixed in the fixing frame 35, and a light emitting element 38 is attached to the support frame 35. Output wires 370 of the electric circuit board 37 are connected between the electric circuit board 37 and the light emitting element 38 and the output shaft 321 to rotate the fan leaves 3210. The light emitting element 38 is preferably a blue light and has a wavelength about 400–500 nm, and the electric circuit board 37 functions to stabilize the voltage/current sent to the light emitting element 38, avoiding damage to the light emitting element by excessive pulse. Further, a switch 39 is fixed on an outer surface of the cap 30 for turning on and off the electric circuit board 37.

In using, during the daytime a switch 39 is used to turn off the light-emitting element 38 as it is not necessary, but the fan leaves 3210 are continually rotated. During nighttime, the light emitting element 38 turned on, with the reflective member 36 adhered at the lower end of the fixing frame 35 reflecting and strengthening the light of the light emitting element 38. The switch 39 also controls a brightness of the light emitting element 38, keeping the device in the best condition with the two stage functions.

When pests are attracted to fly near the device by the color and the volatile chemicals, the sucking air current provided by the fan leaves 3210 pulls them into the spewing member 32 and then into the net 34, without possibility of escaping. Moreover, the transformer 322 driving the drive output shaft 321 and rotating the fan leaves 3210 can keep the drive output shaft 321 rotating preventing over heating, preventing the whole device 3 from disfiguring, and allowing the device to work for a long time, resulting in saving the expense of farmers using this device.

Elongated support rods 310 can be additionally connected with a lower end of each support rod 31 enabling the device 3 to be placed on a field anywhere, except hung up in the conventional way.

Figure 4:
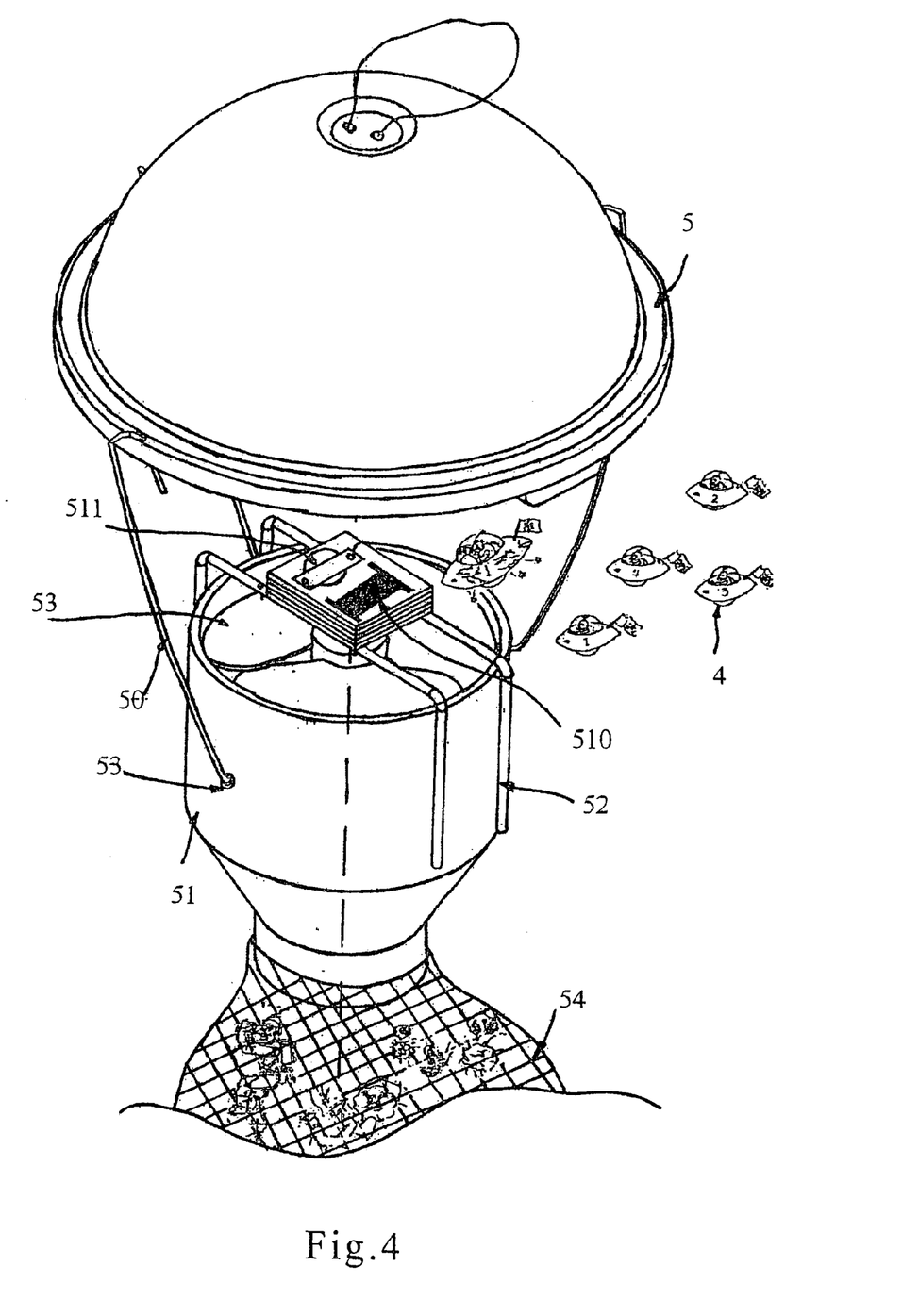
FIG. 4 is a perspective view of a second embodiment of a pest trapping device in the present invention.

Further, FIG. 4 shows a second embodiment of a pest-trapping device, which has almost the same structure of the first embodiment, except the spewing member 51.

The spewing member 51 of the second embodiment is called "Venturis spraying mouth", having an upper opening that is comparatively large, two reversed U-shaped support rods 52 fixed across the upper opening for supporting a transformer 511 for an output shaft 510 and the driving output shaft 510. Fan leaves 53 are connected to the output shaft 510. A spewing member 51 has a plurality of holes 53 for a plurality of cap supporters 50 having lower ends fitted into the plurality of holes 53 for supporting the cap 5. Then a net 54 is fixed around a lower end of a smaller diameter of the spewing member 51 than the upper opening of the spewing member 51. Thus, pests are attracted into the device cannot escape out of the fan leaves 53.

Figure 5:
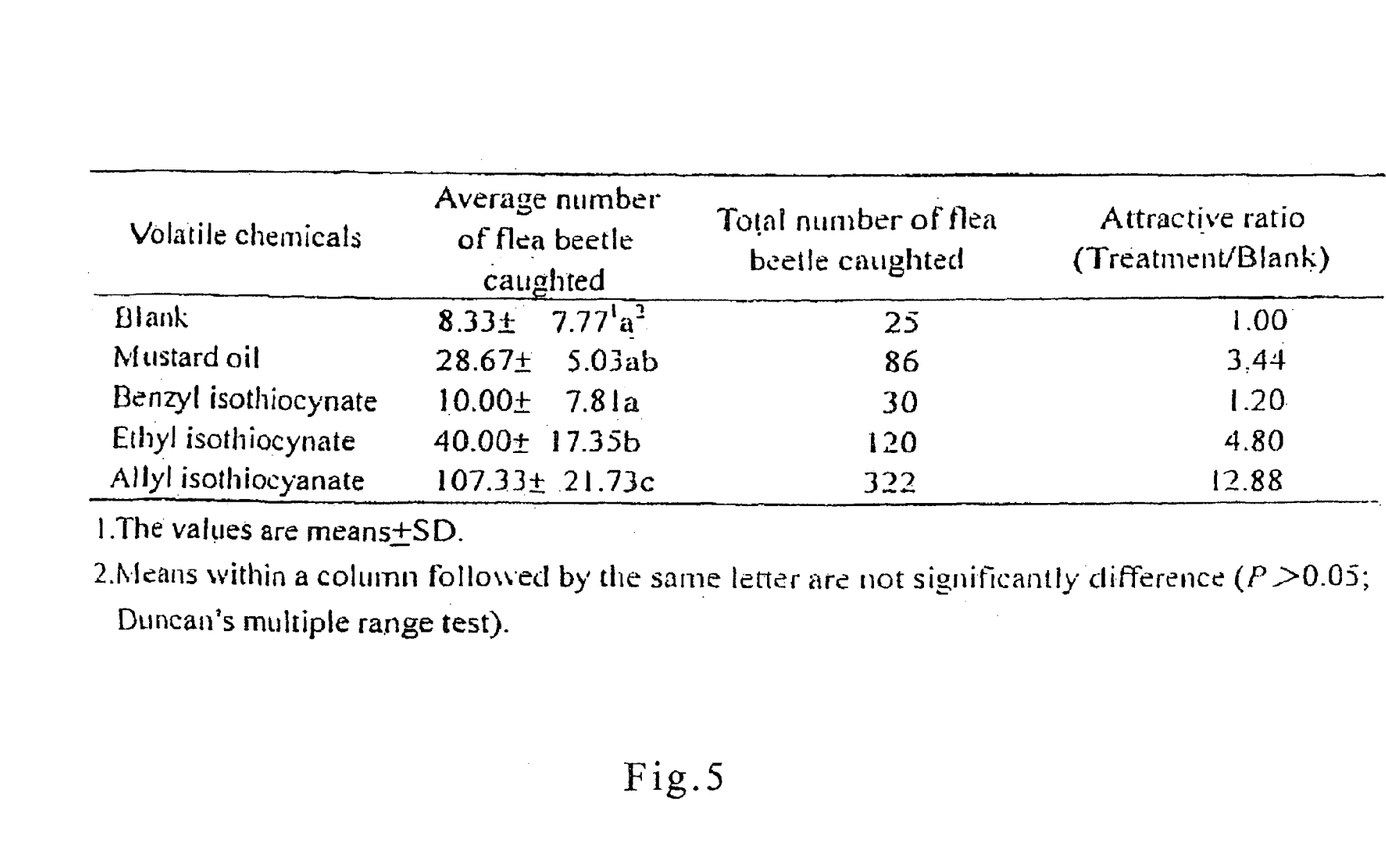
FIG. 5 is the experiment report of luring effects of the colors added in mustard oil.

FIG. 5 is the experiment report of luring effects of the colors added in mustard oil.

The colors used are blue, green, pink, violet, white, and blank (for reference), and it has been found that yellow color is the most effective to attract pests, having 3.27 times of that attracted by the blank, followed by blue, white, and pink for 1.41–1.46 compared to the blank group. Green is the least attractive to pests, having only 1.16 times. Thus it is quite clear that pests are intrigued most by light of certain wavelength and brilliance, also that yellow color is the most attractive to pests, especially to economically harmful pests such as flea beetles which are found throughout the world. Further, the pest trapping device of the invention can attract and trap a large number of harmful pests in the fields, those for crucifer vegetables such as diamond back moths, cutworms, cabbage worms, miners. So the pest trapping device is applicable for trapping large mass of pests, and for keeping watch on harmful pests in the field.

Figure 6:
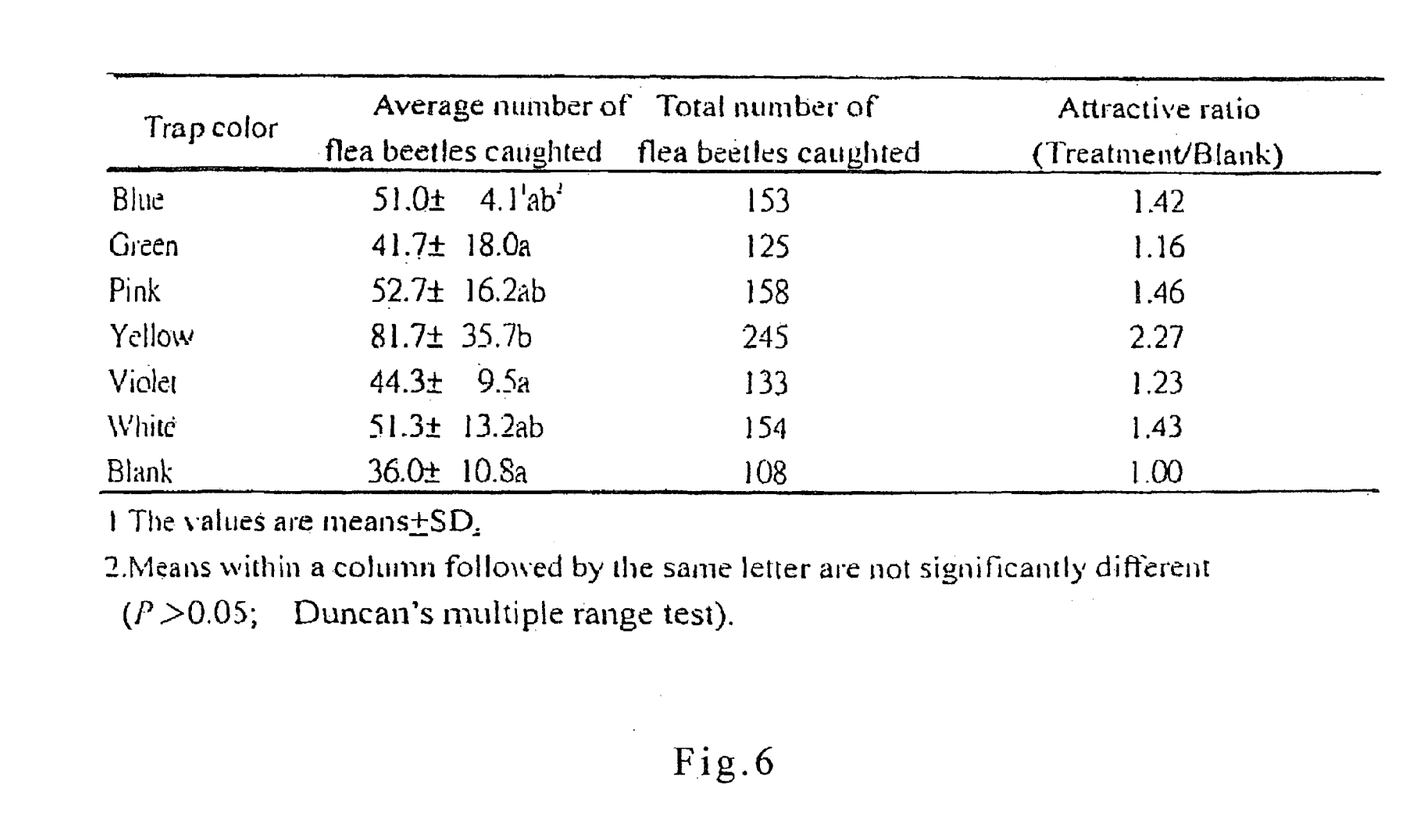
FIG. 6 is the data of luring and destroying effect of the yellow-colored board added with several chemicals with various smells for flea beetles.

The FIG. 6 is the data of luring and destroying effect of the yellow-colored board added with several chemicals with various smells for flea beetles.

Next, economically harmful pests are most likely to eat green vegetable, broccoli, Chinese mustard, turnip and other edible vegetable, and white mustard and black mustard seeds contain a substantive mustard oil, which includes mainly allyl isothiocyanate having volatile and pungent property for effectively attracting flea beetles. Allyl isothiocyanate has the highest effect of 12.88 times the blank group, as the second reference document of the experiment shows. The next is ethyl isothiocyanate having the effect of 4.8 times the blank group. The mustard oil having the effect of 3.44 times the blank group. The benzyl isothiocyanate having the least effect of 1.20 times to the blank group. Thus allyl isothiocyanate has the same effect to different kinds of pests as the data show.

The pest trapping device 3 in the invention has an attracting and trapping function for many kinds of harmful pests, utilizing the most proper color, smell and light to attract them, so that farmers do not use excessive amount of insecticide, which may remain on grown vegetables, and consumers may accordingly be prevented from getting health effects from the insecticide. The pests possibly attracted include leoptra, diptera, coleoptera, etc. more than tens of them, able to be destroyed by the pest-trapping device in the invention in a large mass.

As can be understood by the foresaid description, the invention has the following advantages.

1. The pest trapping device has the "Venturis spraying mouth" used as the spewing member, and this spraying mouth is such structured that pests cannot escape out of the device once pests are sucked therein.

2. The pest-trapping device has a curved cap so that light can pass through to reach wide direction because of the large dimension of the curved shape.

3. The pest trapping device is colored yellow, using allyl isothiocyanate or Cuelure, benzyl clove oil, and pest pheromone in liquid or solid state placed in the tray as smell chemicals to attract pests and trapped most effectively therein.

4. Farmers can use this pest trapping device instead of insecticides to lower expense for damage prevention of vegetables.

5. Farmers can use this pest trapping device instead of insecticides reducing insecticide residue on vegetables avoiding adverse impacts on farmers's and consumers' health.

While the preferred embodiment of the invention has been described above, it will be recognized and understood that various modifications may be made therein and the appended claims are intended to cover all such modifications that may fall within the spirit and scope of the invention.

What is claimed is:

1. A pest trapping device comprising:
   a) a cap having a curved round shape;
   b) a spewing member being cylindrically shaped and having:

I) a hollow interior;
ii) a support member connected to an upper end section thereof;
iii) a driving device connected to the support member; and
iv) an output shaft extending downwardly from the support member and being controlled by the driving device;
c) a plurality of support rods, each of the plurality of support rods having a first end connected to a circumferential edge of the cap and a second end connected to the upper end section of the spewing member;
d) a tray located on the support member and holding a volatile chemical;
e) a fan connected to the output shaft and having a plurality of leaves;
f) a net located around a bottom end of the spewing member and having meshes;
g) a fixing frame located in an interior of the cap;
h) a reflective member connected to a bottom of the fixing frame;
I) a light emitting member located on the fixing frame;
j) an electric circuit board located on the fixing frame and electrically connected to the driving device and the light emitting member; and
k) a switch located on an outer surface of the cap and electrically connected to the electric circuit board and selectively turning off and on the light emitting member and the driving device.

2. The pest trapping device according to claim 1, wherein an outer surface of the pest trapping device has a yellow color.

3. The pest trapping device according to claim 1, wherein the light emitting member is a violet-colored light tube.

4. The pest trapping device according to claim 1, wherein the volatile chemical is allyl isothiocyanate.

5. The pest trapping device according to claim 1, wherein the switch is a two stage switch.

6. The pest trapping device according to claim 1, further comprising a plurality of elongated support rods, each of the plurality of elongated support rods being connected at a first end thereof to one of a respective the plurality of support rods.

7. The pest trapping device according to claim 1, wherein the support member is integrally formed with the spewing member.

8. The pest trapping device according to claim 1, wherein the driving device is a transformer.

\* \* \* \* \*